Dec. 22, 1936.  C. KAUFMAN  2,064,918
BOLT AND THE LIKE AND PROCESS OF MAKING
Filed Feb. 15, 1936  2 Sheets-Sheet 1
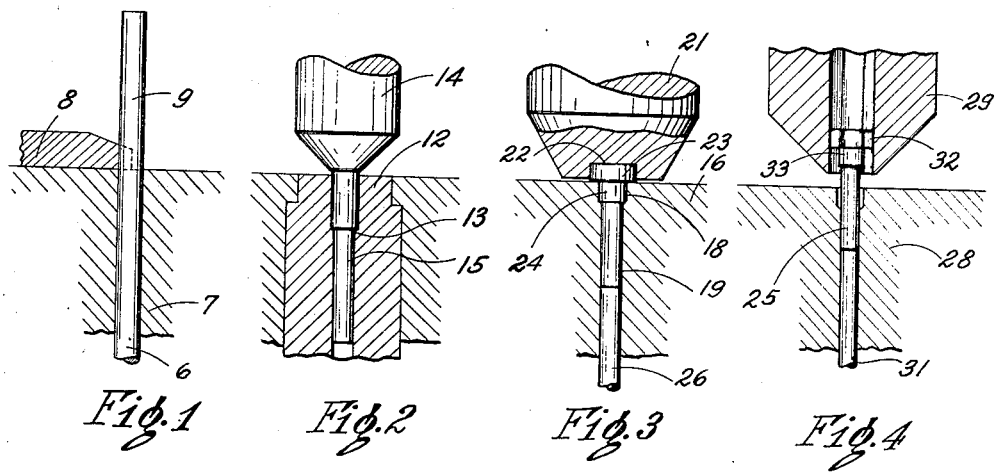
Inventor
CHARLES KAUFMAN
By Richey & Watts
Attorneys Dec. 22, 1936. C. KAUFMAN 2,064,918
BOLT AND THE LIKE AND PROCESS OF MAKING
Filed Feb. 15, 1936 2 Sheets-Sheet 2
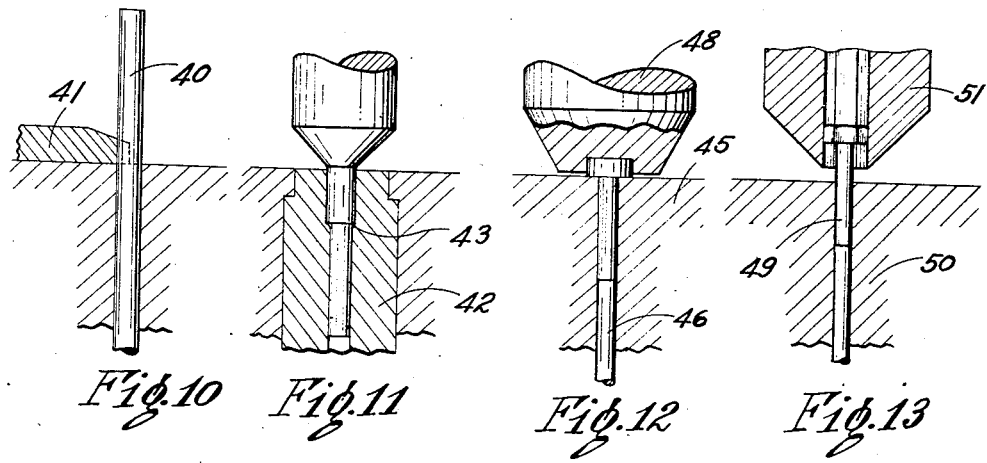
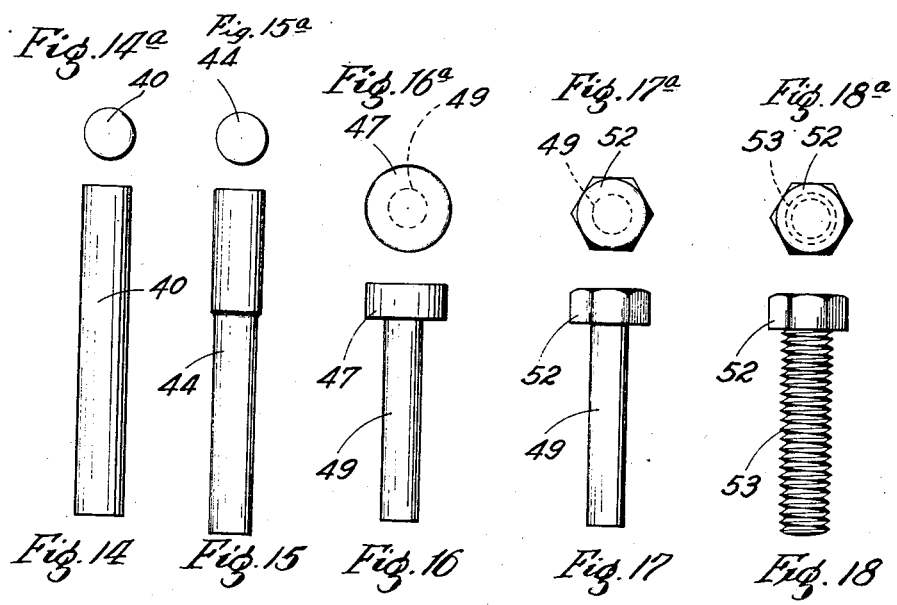
Inventor
CHARLES KAUFMAN
By Richey & Watts
Attorneys

UNITED STATES PATENT OFFICE 2,064,918

BOLT AND THE LIKE AND PROCESS OF MAKING

Charles Kaufman, Parma, Ohio, assignor to The National Machinery Company, Tiffin, Ohio, a corporation of Ohio Application February 15, 1936, Serial No. 64,066

38 Claims. (Cl. 10—27)

This invention relates to bolts and methods of making the same, and more particularly to an improved method of making bolts in which the metal of the stock is cold worked by pressure operations.

Generally speaking, the present invention includes a process of making bolts by upsetting and extruding and to a bolt having improved physical properties produced by the process. The process consists in extruding a portion of the length of a blank of greater diameter than the over-all diameter of the threads to the pitch diameter in one operation and upsetting the unextruded portion to form a head. More specifically the process also includes the step of upsetting a part of the extruded portion to form a shank. Threads are then rolled on the extruded portion. More specifically the process consists of extruding a portion of the blank to the pitch diameter of the threads to be rolled in one extrusion operation, upsetting the unextruded part of the blank in a single blow to form a head, upsetting a part of the extruded portion to the over-all thread diameter to provide a shank between the head and the threads, and rolling threads upon the remainder of the extruded portion.

By these last-mentioned operations the metal of the head is worked once by the upsetting operation, the metal of the shank is worked once by extruding and once by upsetting, greatly increasing the strength of the metal between the head and the threads, and the metal of the threaded portion is worked once by extrusion and once by the rolling of the threads so that the threaded portion is worked about the same amount as the shank between the threads and the head providing adequate strength and hardness to the threads and eliminating any danger of the threads becoming roughened or splintered by a "shortening" in the metallic structure due to excessive working.

This invention also includes the novel step of upsetting a part of the stock which has been previously extruded, which step may be used in combination with other steps or arrangements of steps. In addition the invention includes making a bolt by upsetting and extruding operations adapted to be arranged in manufacture so that no extrusion operation need be performed in the die in which the upsetting is performed, thereby permitting the making of bolts with extremely short unthreaded shank portions between the threads and the head.

Alternatively this invention also includes a process of making a bolt in which the threads extend throughout the length of the shank in which there is no unthreaded portion between the threads and the head. In such process the stock of greater diameter than the over-all diameter of the threads to be formed is extruded in a single operation through a portion of its length to the pitch diameter of the threads, the unextruded portion is upset to form a head and threads are rolled upon the extruded portion.

This invention also includes a bolt, screw or the like in which the metal is substantially uniform in strength throughout the length of the shank. More specifically the bolt of this invention includes an unthreaded shank portion and a threaded portion, each of which is characterized by being twice worked. More specifically the bolt embodies a head upset in a single blow from stock which is over-sized with respect to the shank, an unthreaded shank portion characterized by being once extruded and once upset, and a threaded portion characterized by being once extruded and further worked by the rolling of threads thereon. Alternatively the bolt of this invention may embody a head upset from stock of greater diameter than the over-all diameter of the threads and a shank which is once extruded and roll threaded throughout its length. This invention also includes the feature of an extruded and upset portion in the shank which may be combined with other features of construction. Additional features and advantages of the invention will appear from the following detailed description. This invention relates to and is in some respects an improvement upon the processes and products disclosed and claimed in my prior Patents Nos. 1,617,122, February 8, 1927, and Re. 19,348, October 23, 1935, and the patent to Friedman, No. 2,030,290, February 11, 1936.

In the accompanying drawings which show a completed bolt and blanks in various stages of manufacture and diagrammatically illustrate apparatus for carrying out the steps:

Figure 1 is a sectional view of a mechanism to shear off a length of bolt making stock;

Figure 2 is a sectional view of apparatus that may be employed to extrude a portion of the sheared length of stock showing a blank in position;

Figure 3 is a sectional view of apparatus that may be employed to upset a head and a portion of the shank of a bolt made according to my invention;

Figure 4 is a sectional view of apparatus to trim the head of a bolt blank;

Figure 5 is a side view of a length of stock employed to form the bolt;

Figure 5a is an end view of the same;

Figure 6 is a side view of a blank as produced by the apparatus of Figure 2;

Figure 6a is an end view of the same;

Figure 7 is a side view of a blank as produced by the apparatus of Figure 3;

Figure 7a is an end view of the same;

Figure 8 is a side view of the blank produced by the apparatus of Figure 4;

Figure 8a is an end view of the same;

Figure 9 is an elevation of the finished bolt having the threads formed thereon;

Figure 9a is an end view of the same;

Figures 10 to 13 illustrate an apparatus corresponding generally to that shown in Figures 1 to 4 modified to form a different type of bolt according to my invention.

Figures 14 to 18 and 14a to 18a correspond to Figures 5 to 9 and Figures 5a to 9a respectively of the preferred embodiment and illustrate the various forms given the bolt blank by the apparatus of Figures 10 to 13.

Generally speaking, I carry out the process and produce the product of this invention by shearing off a length of rod or wire stock, extruding a portion of the length of stock to pitch diameter to an axial extent corresponding to the length of the shank in the finished article. Subsequent to the extrusion the blank is pressed in a die having an axial bore, a portion of which corresponds to the pitch diameter and said portion having an axial extent corresponding to the axial extent of the threads in the finished article. Adjacent this pitch diameter section an enlarged bore is formed when the bolt is to be provided with an unthreaded shank portion, said enlargement corresponding to the over-all diameter of the threads in the finished article. While the extruded blank is arranged in such a die a head is upset thereon and the heading pressure is effective to upset a portion of the extruded stock into the enlarged portion of the die. Subsequent to this the blank may be trimmed and threads rolled thereon in the usual manner.

The method above outlined is advantageously suited to the machine and method of handling shown and described in the patent to Earl R. Frost, No. 2,020,658, November 12, 1935, although it will be understood that the present invention is not limited to that machine or method or to any particular apparatus and can be carried out in any suitable way. As will be better understood by reference to said patent rod or wire stock 6 is fed through an opening in the bed frame 7 and when a sufficient length is fed therethrough a shear such as 8 is moved transversely with respect to the opening and cuts off a length of stock 9 suited to form a bolt. The blank 9 is then transferred to a die 12 having an extrusion throat 13 therein and upon being forced into said die by a heading slide tool 14 forms a blank as at 15 in which the stock is extruded throughout that portion which forms the shank in the finished article. Subsequent to the extrusion of the stock which results in blank 15 said blank is transferred to a holding die as at 16.

The die 16 is provided with a bore and at the face end of said bore is enlarged as at 18 to a diameter which corresponds to the over-all diameter of the threads in the finished article. The diameter of the inner portion of the bore in die 16 corresponds to the pitch diameter of the threads in the finished article and is identified by character 19. While positioned in the die 16 a header slide tool 21 having a head forming recess 22 thereon advances toward the die 16 and with a single blow upsets a head as at 23 and simultaneously upsets the shank 24 into the enlarged portion 18 of the die. During the advance of the header slide tool 21 the movement of the blank axially in response to header slide pressure is effectively prevented by knockout 26.

Since the shoulder between the portions 18 and 19 of the die 16 is not called upon to do any extruding work the die may be constructed to effectively resist the heading pressures alone and it is therefore unnecessary to combine in this die characteristics which will enable the shoulder both to resist the lateral pressure of the heading and the wear of extrusion. Likewise it will be understood that the axial length of the portion 18 can be made as short as desired and of any length within which a satisfactory upset of the metal can be obtained. It will also be understood when making a bolt having no unthreaded shank portion the extruded blank is simply transferred to a plain holding die and headed.

As will be observed from Figures 3 and 7 the head 23 of the bolt blank worked in the apparatus of Figure 3 is substantially circular in cross section and may carry a flash intermediate the faces of the head as the result of the heading operation. Following the heading operation the blank may be transferred to a trimming die station as at 28 arranged to co-operate with a header slide tool 29 provided with a bore having a polygonal cross section. As said header slide tool 29 advances toward the trimming station 28 a knockout 31 arranged to abut the shank of the blank therein is timed with respect to the header slide movements so as to forcibly eject the blank into the hollow header slide tool 29. The co-ordination of the action of the ejector rod 31 and the movements of the hollow tool 29 are such that the edges of the tool 29 trim the head of the blank to a polygonal shape as at 32 (see Figure 8). Subsequent to the trimming of the blank which results in the blank 33 of Figure 8 the blanks may be successively pointed and roll threaded throughout the extent of their least diameter according to the teachings of said Frost patent, resulting in the finished blank 35 as shown in Figure 9.

With respect to the grain structure in a blank made according to my invention it will be observed that the unthreaded portion of the shank extending between the threads and the heads is twice worked prior to the thread rolling. That portion of the shank which is to receive the threads indicated as at 25 in Figure 8 is but once worked during the shaping of the blank and thus acquires a hardness and grain structure which is more easily machined by the pointer and more easily roll threaded than material which has been twice worked. This results in considerable economy in machining and handling the blanks and eliminates any danger of the threads becoming roughened or splintered by a "shortening" in the metallic structure due to excessive working. The unthreaded shank portion acquires a hardness and strength due to the double working of the metal therein which exceeds the strength and hardness found in this portion of a bolt blank made according to other comparable methods.

To better enable those skilled in the art to carry out the method which I have disclosed the following specific example is given as a successful instance of the practice of the method. To produce bolts known in the art as "⅜ inch bolts" material having a diameter of .390 of an inch may be employed. In the extrusion this material may be reduced to a diameter of .330 of an inch throughout that portion which forms the shank of the finished article. During the upsetting that portion of the shank which is to be threaded is maintained in the holding die at .330 of an inch and the portion adjacent the head is increased in diameter by the upsetting to have a diameter of .375 of an inch which corresponds to the over-all diameter of the threads.

In the event that it is desired to form a bolt blank adapted to receive threads through the length of the shank, the extrusion is carried out in the manner described in connection with the preferred embodiment and the step of upsetting a portion of the shank is dispensed with. This variation of my method may be carried out by the apparatus shown in Figures 10 to 13. A length of stock 40 having a diameter corresponding to the diameter of the blank 9 in the preferred embodiment is sheared by a member 41 in the usual manner and transferred to the extrusion die 42. In the die 42 the blank 40 is extruded by extrusion throat 43 throughout that portion of the blank which ultimately becomes the shank of the blank. The result of this operation is illustrated by the blank 44 of Figure 15. Following the extrusion the extruded blank is transferred to a holding die 45 which is of uniform diameter throughout its length. While held in said die and backed up by the knockout pin 46, the head 47 is upset by the header tool 48. The headed blank resulting from the upsetting described has a shank portion 49 of uniform diameter throughout its length.

It will be observed that there is no upsetting in the shank portion of the shank according to this form of my invention. From the heading station the headed blank is transferred to a trimming station as illustrated in Figure 13 wherein the blank which is provided with a head 47 is ejected from a die 50 and forced into a polygonal trimming punch 51 to give the head the desired polygonal shape. The blank resulting from the polygonal trimming is illustrated in Figure 17 and is provided with a polygonal head 52 and retains the shank 49 as originally formed in the extrusion die. Thus far the shank of the blank has been worked but once; that is, by the extrusion process and the head of the blank which was upset from unextruded stock has been trimmed. The diameter of the shank 49 corresponds to the diameter of the shank 25 in the preferred embodiment and distinguishes over the preferred embodiment only by the fact that no part of the shank has been upset.

Following the trimming in die 51 the blank is preferably roll threaded throughout the length of the shank. The roll threading, it will be observed, increases the over-all diameter of the shank and thus further works, hardens and improves the grain characteristics of the shank. The blank in its finished form is illustrated in Figure 18 and as shown is provided with threads 53 extending throughout the length of the shank. The grain structure of the finished blank corresponds to the finished blank of the preferred embodiment in that the shank is twice worked throughout the length thereof (once by extrusion and once by roll threading) and the over-all diameter of the twice worked shank is less than the original stock diameter and the head is upset from unextruded stock having a greater diameter than said over-all shank diameter.

Although I have described a method for carrying out my invention in considerable detail and have made specific references to apparatus and examples, I appreciate that those skilled in the art may effect certain changes and modifications without departing from the scope of the invention as defined in the appended claims.

I claim:

1. A bolt having a head upset from stock of greater diameter than the finished shank, a shank portion adjacent the head of over-all thread diameter and a threaded portion, the grain structure of said bolt characterized by having a single blow upset head and a shank twice worked throughout its length.

2. A bolt having a head, a shank portion of over-all thread diameter adjacent said head and a threaded portion, the grain structure of said bolt being characterized by having a single blow upset head and by being once extruded and once upset throughout said over-all thread diameter portion.

3. A bolt blank having a head upset from stock of greater diameter than the finished shank and a shank portion adjacent the head once extruded to the pitch diameter of the threads in the finished article and once upset to over-all thread diameter.

4. A bolt having a head, an unthreaded shank portion of over-all thread diameter adjacent said head and a threaded shank portion, said bolt characterized by a grain structure resulting from extruding and upsetting the material of the unthreaded shank portion.

5. A bolt having a head upset from unextruded stock, an unthreaded shank portion adjacent the head and a threaded shank portion, the unthreaded shank portion having a grain structure characteristic of that resulting from extruding and upsetting material.

6. A bolt having a head with a grain structure characteristic of that resulting from upsetting unextruded stock in a single blow, and a shank including a portion adjacent the head having a grain structure characteristic of that produced by extruding and upsetting the material.

7. A bolt having a head upset in a single blow from unextruded stock, and a shank portion adjacent the head upset from extruded stock.

8. A bolt having a head upset from unextruded stock, an unthreaded shank portion adjacent the head upset from extruded stock and a threaded portion embodying threads rolled upon extruded stock.

9. A bolt having a head upset in a single blow from unextruded stock, an unthreaded shank portion adjacent the head upset from extruded stock and a threaded portion embodying threads rolled upon extruded stock.

10. A bolt having a head, an unthreaded shank portion of over-all thread diameter adjacent said head and a threaded shank portion, said bolt characterized by a grain structure resulting from extruding and upsetting the material of the unthreaded shank portion, and by extruding and rolling threads on the threaded shank portion whereby the shank material acquires strength and hardness resulting from being twice worked throughout its length.

11. A bolt having a head, a shank portion corresponding to the over-all diameter of the threads in the finished article adjacent said head, a shank portion of lesser diameter adjacent said last named portion, the entire shank of said blank characterized by being extruded and said last named portion characterized by being upset.

12. A bolt blank having a head, a shank portion adjacent said head having a diameter corresponding to the over-all thread diameter in the finished article, a shank portion adjacent said last named portion having a lesser diameter than said last named portion, the grain structure and diameter of said last named portion resulting from successive extruding and upsetting, the grain structure and diameter of said other shank portion resulting from extrusion.

13. That method of making a bolt blank which comprises shearing a length of stock, extruding a portion of said length of stock to the pitch diameter of the threads in the finished article, upsetting a head and a part of said extruded portion whereby the shank is provided with a section adjacent the head of greater diameter than said extruded shank forming part.

14. That method of making a bolt blank which comprises shearing a length of stock, extruding all of that portion of the length of stock which forms the shank in the finished article to the pitch diameter of the threads of said article, upsetting a head and a part of said extruded portion whereby to form a shank section adjacent the head of greater diameter than the remaining portion of the shank.

15. That method of making a bolt blank which comprises extruding all of that portion of a length of stock which forms the shank in the finished article, upsetting a head and a part of said extruded portion whereby to form a shank section adjacent said head having a diameter corresponding to the over-all thread diameter in the finished article and exceeding the diameter of the remaining shank portion.

16. That method of making a bolt which comprises extruding a portion of a length of stock sufficient to form the shank in the finished article, upsetting the unextruded portion of said length of stock to form a head and upsetting a part of said extruded portion adjacent said head and rolling threads on the extruded portion of the shank adjacent said upset shank portion.

17. That method of making a bolt which comprises shearing a length of stock, extruding a portion of said length of stock sufficient to form the shank in the finished article to the pitch diameter of the threads in said article, with a single blow upsetting a head and a part of said extruded portion to form a shank portion adjacent the head of over-all thread diameter and rolling threads upon the extruded shank portion adjacent said upset shank portion.

18. That method of making a bolt blank comprising extruding all of that portion of a length of stock which forms the shank in the finished article to the pitch diameter of the threads in said article, simultaneously upsetting a head and a part of said extruded shank adjacent said head.

19. That method of making a bolt comprising extruding all of that portion of the length of stock which forms the shank in the finished article to the pitch diameter of the threads in said article, simultaneously upsetting a head and a part of said extruded shank adjacent said head, and rolling threads upon the extruded shank portion adjacent said upset shank portion.

20. That method of making a bolt including extruding a portion of a length of stock, upsetting the unextruded portion to form a head, upsetting part of the extruded portion to a larger diameter, and rolling threads on the remainder of the extruded portion.

21. That method of making a bolt including extruding a portion of a length of stock, upsetting the unextruded portion in a single blow to form a head, upsetting part of the extruded portion to a larger diameter, and rolling threads on the remainder of the extruded portion.

22. The method of making a bolt including shearing off a length of elongated stock having a diameter greater than the over-all thread diameter of the finished bolt, extruding a portion of said length of stock, upsetting the remainder to form a head, upsetting a part of the extruded portion to the over-all thread diameter of the finished bolt and rolling threads on the remainder of the extruded portion.

23. The method of making a bolt or the like from stock having a larger diameter than the shank diameter of the finished bolt including the steps of extruding a portion of a length of stock, upsetting the remainder to form a head, and upsetting a part of the extruded portion to increase its diameter to the shank diameter of the finished bolt.

24. A bolt including a threaded portion, a shank portion upset from extruded stock having a diameter substantially equal to the over-all diameter of the threaded portion and a head upset from stock of greater diameter than said upset shank portion.

25. A bolt including a threaded portion, a shank portion upset from extruded stock and a head upset from stock of greater diameter than said upset shank portion.

26. A bolt including a shank portion upset from extruded stock and a head upset from unextruded stock of greater diameter than the finished shank portion.

27. A bolt having an upset head and a shank provided with rolled threads, said head having a grain structure resulting from being upset from stock of greater diameter than the over-all diameter of said threads and an upset portion between said head and said threads having a diameter substantially equal to the diameter of said rolled threads.

28. The method of making a bolt from stock of a greater diameter than the over-all thread diameter of the finished bolt comprising reducing the entire shank forming portion of a blank of such stock to the pitch diameter of the threads by forcing the same through a single extrusion die without reducing the diameter of the remainder of said blank, and upsetting said remainder to form a head.

29. The method of making a bolt from stock of a greater diameter than the over-all thread diameter of the finished bolt comprising reducing the entire shank forming portion of a blank of such stock to the pitch diameter of the threads by forcing the same through a single extrusion die without reducing the diameter of the remainder of said blank, and in a single blow upsetting said remainder to form a head.

30. The method of making a bolt from stock of a greater diameter than the over-all thread diameter of the finished bolt comprising reducing the entire shank forming portion of a blank of such stock to the pitch diameter of the threads by forcing the same through a single extrusion die without reducing the diameter of the remainder of said blank, upsetting said remainder to form a head, and rolling threads on said reduced portion.

31. The method of making a bolt from stock of a greater diameter than the over-all thread diameter of the finished bolt comprising reducing the entire shank forming portion of a blank of such stock to the pitch diameter of the threads by forcing the same through a single extrusion die without reducing the diameter of the remainder of said blank, in a single blow upsetting said remainder to form a head, and rolling threads on said reduced portion.

32. A bolt including a head and a shank, said shank having threads thereon, the threaded portion having a metallic structure resulting from rolling threads on once extruded stock and said head having a metallic structure resulting from upsetting stock of a greater diameter than the over-all diameter of said finished threads and said shank having a diameter equal to said over-all thread diameter throughout its length.

33. A bolt including a head and a shank, said shank having threads thereon, the threaded portion having a metallic structure resulting from rolling threads on once extruded stock and said head having a metallic structure resulting from being formed by a single upsetting blow on stock of greater diameter than the over-all diameter of said finished threads and said shank having a diameter equal to said over-all thread diameter throughout its length.

34. That method of making a headed and threaded bolt with a shank uniform in diameter throughout its length which comprises shearing a blank from stock having a diameter exceeding said uniform diameter, reducing said blank throughout the shank forming portion by forcing the same through an extrusion die without reducing the remainder of the blank, upsetting said remainder to form a head and working the metal of the blank throughout the extruded shank portion to increase the diameter of said shank to said uniform diameter and improve the grain structure thereof.

35. That method of making a headed and threaded bolt with a shank uniform in diameter throughout its length which comprises shearing a blank from stock having a diameter exceeding said uniform diameter, reducing said blank throughout the shank forming portion by forcing the same through an extrusion die without reducing the remainder of the blank, upsetting said remainder to form a head and working the metal of the blank throughout the extruded shank portion to effect an increase in the diameter, said working of the metal including the step of rolling threads upon the shank.

36. That method of making a headed bolt having threads on the shank portion thereof and having a shank uniform in diameter throughout its length which comprises shearing a blank from rod or wire stock having a diameter exceeding said uniform diameter, extruding said blank throughout that portion which forms the shank in the finished article and maintaining the orginal diameter of that portion which forms the head in the finished article during said extrusion, upsetting said unextruded portion to form a head and working the metal of the blank throughout the length of the shank to increase the over-all diameter thereof to a diameter less than said original diameter and greater than the diameter resulting from the extrusion, said working of the shank portion including the step of rolling threads on the shank.

37. The method of making a bolt from stock of a greater diameter than the over-all thread diameter of the finished bolt comprising reducing the entire shank forming portion of a blank of such stock to the pitch diameter of the threads by forcing the same through a single extrusion die without reducing the diameter of the remainder of said blank, upsetting said remainder to form a head and rolling threads throughout the entire length of the shank.

38. The method of making a bolt from stock of greater diameter than the over-all thread diameter of the finished bolt comprising reducing the entire shank forming portion of a blank of such stock to the pitch diameter of the threads by forcing the same through a single extrusion die without reducing the diameter of the remainder of said blank, upsetting in a single blow said remainder to form a head and rolling threads throughout the entire shank forming portion.

CHARLES KAUFMAN.